United States Patent
Lee

(10) Patent No.: US 11,592,118 B2
(45) Date of Patent: Feb. 28, 2023

(54) SOLENOID VALVE

(71) Applicant: HYUNDAI MOBIS Co., Ltd., Seoul (KR)

(72) Inventor: Jeonggeol Lee, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/531,514

(22) Filed: Nov. 19, 2021

(65) Prior Publication Data
US 2022/0205552 A1    Jun. 30, 2022

(30) Foreign Application Priority Data
Dec. 28, 2020 (KR) .......................... 10-2020-0184217

(51) Int. Cl.
| | | |
|---|---|---|
| F16K 31/06 | (2006.01) | |
| B60T 13/68 | (2006.01) | |
| B60T 15/02 | (2006.01) | |

(52) U.S. Cl.
CPC ......... *F16K 31/0634* (2013.01); *B60T 13/686* (2013.01); *B60T 15/028* (2013.01)

(58) Field of Classification Search
CPC ............. F16K 31/0634; F16K 31/0606; F16K 31/0686; F16K 31/0689; F16K 31/10
See application file for complete search history.

(56) References Cited

U.S. PATENT DOCUMENTS

| | | | | |
|---|---|---|---|---|
| 4,102,526 A | * | 7/1978 | Hargraves | ........... F16K 31/0627 251/129.21 |
| 4,304,258 A | * | 12/1981 | Mitchell | ................. F16K 11/10 137/596.17 |
| 5,445,189 A | * | 8/1995 | Yamamuro | ......... F16K 31/0679 303/119.2 |
| 2002/0104571 A1 | * | 8/2002 | Hess | .................... F16K 31/0634 137/625.29 |
| 2003/0155019 A1 | * | 8/2003 | Hess | ...................... F16K 11/048 137/625.5 |
| 2011/0089350 A1 | * | 4/2011 | Beneker | ..................... F01L 1/34 251/129.15 |
| 2011/0121023 A1 | * | 5/2011 | Milan | ........................ G04F 1/02 222/638 |
| 2017/0282882 A1 | * | 10/2017 | Takahashi | ................ B60T 13/58 |
| 2018/0334153 A1 | * | 11/2018 | Kuenkel | ................ B60T 13/686 |
| 2019/0049025 A1 | * | 2/2019 | Jeon | ........................ F16K 11/105 |
| 2020/0158249 A1 | * | 5/2020 | Warashina | ........... F16K 31/0634 |

* cited by examiner

*Primary Examiner* — Michael R Reid
(74) *Attorney, Agent, or Firm* — Morgan, Lewis & Bockius LLP

(57) ABSTRACT

According to at least one aspect, the present disclosure provides a solenoid valve comprising: an armature that moves upward or downward based on whether a current is supplied; a pusher that is in contact with the armature and linearly moves based on the movement of the armature; a spring that is compressed or expanded based on the linear movement; a plurality of input lines that receive brake fluid from a main master cylinder or a sub-master cylinder; an output line that supplies the brake fluid in a direction toward a wheel brake; and a stator that connects the input lines and the output line to provide a movement path, through which the brake fluid moves, and opens one input line and closes the other input lines among the plurality of input lines based on whether the current is supplied.

13 Claims, 4 Drawing Sheets

SOLENOID VALVE

CROSS-REFERENCE TO RELATED APPLICATION

This application claims priority to and the benefit of Korean Patent Application No. 10-2020-0184217 filed on Dec. 28, 2020, the disclosure of which is incorporated herein by reference in its entirety.

BACKGROUND

1. Technical Field

The present disclosure relates to a solenoid valve.

2. Discussion of Related Art

Contents described in this section merely provide background information on the present disclosure and do not constitute the related art.

An electric hydraulic brake device according to the related art is equipped with a normal open-type solenoid valve and a normal closed-type solenoid valve. The normal open-type solenoid valve refers to a solenoid valve that is opened when no current is applied from a controller, that is, during a normal time. Meanwhile, the normal closed-type solenoid valve refers to a solenoid valve that is closed when no current is applied from the controller, that is, during the normal time.

Thus, the electric hydraulic brake device according to the related art is equipped with the normal open-type solenoid valve and the normal closed-type solenoid valve to supply brake fluid received from a hydraulic pressure generation unit to wheel brakes. For example, the normal closed-type solenoid valve is mounted as a solenoid valve that receives the brake fluid from a main master cylinder, and the normal open-type solenoid valve is mounted as a solenoid valve that receives the brake fluid from a sub-master cylinder. When the controller operates normally, a current is applied to the normal closed-type solenoid valve to supply the brake fluid in a direction from the main master cylinder to the wheel brakes. Meanwhile, when the controller malfunctions, the current is cut off in the normal closed-type solenoid valve, and thus the wheel brakes no longer receive the hydraulic pressure from the main master cylinder but receive the brake fluid from the sub-master cylinder connected to the normal open-type solenoid valve.

In this way, since the electric hydraulic brake device according to the related art should be equipped with both the normal open-type solenoid valve and the normal closed-type solenoid valve, the number of solenoid valves for implementing a redundancy braking system increases, resulting in an increase in manufacturing costs.

SUMMARY

The purpose of the present disclosure is to reduce the number of solenoid valves required for an electric hydraulic brake system and to reduce manufacturing costs by changing a structure so that one solenoid valve is used but brake fluid may move in two directions inside the solenoid valve.

According to at least one aspect, the present disclosure provides a solenoid valve comprising: an armature that is movable upward or downward based on whether a current is supplied; a pusher that is in contact with the armature and linearly movable based on a movement of the armature; a spring that is compressed or expanded based on the linear movement; a plurality of input lines that receive brake fluid from a main master cylinder or a sub-master cylinder; an output line that supplies the brake fluid in a direction toward a wheel brake; and a stator that connects the plurality of input lines and the output line to provide a movement path, through which the brake fluid moves, and opens one input line and closes the other input lines among the plurality of input lines based on whether the current is supplied.

As described above, the effect of the present disclosure is to reduce the number of solenoid valves required for an electric hydraulic brake system and to reduce manufacturing costs by changing a structure so that one solenoid valve is used but brake fluid may move in two directions inside the solenoid valve.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
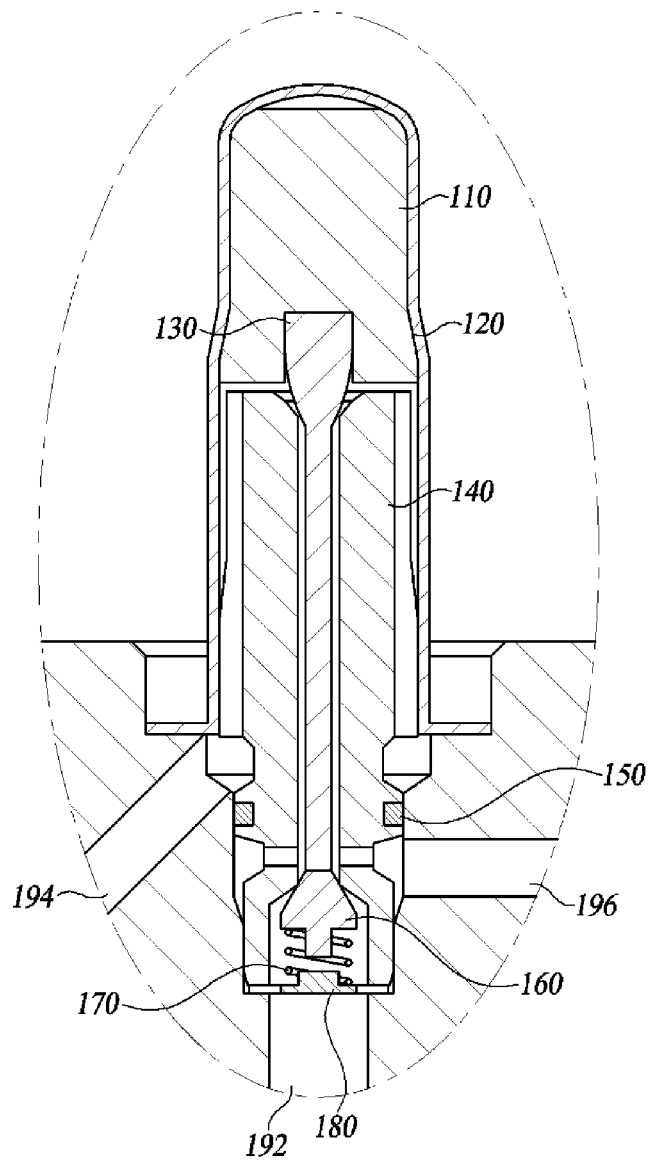
FIG. 1 is a cross-sectional view of a solenoid valve according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a cross-sectional view of a solenoid valve according to one embodiment of the present disclosure.

Figure 2:
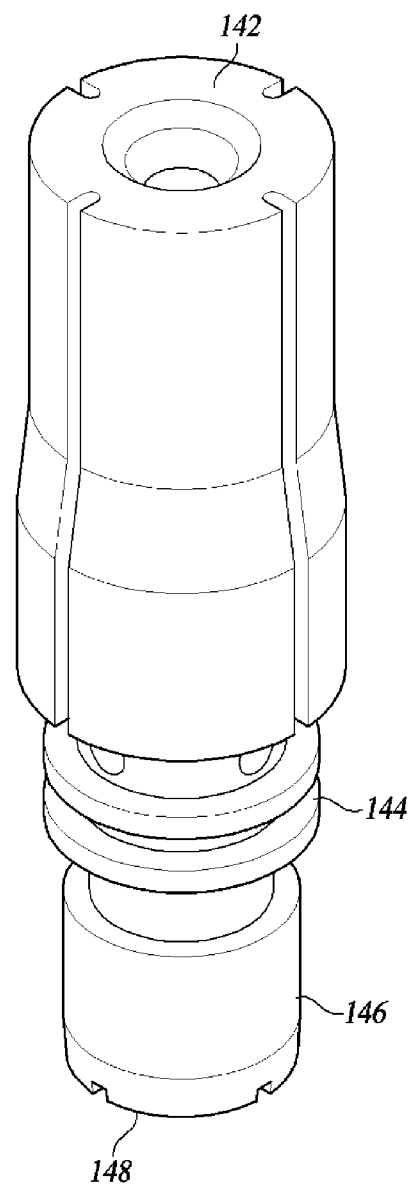
FIG. 2 shows an assembly view and an exploded view of a stator according to one embodiment of the present disclosure.

FIG. 2 shows an assembly view and an exploded view of a stator according to one embodiment of the present disclosure.

Referring to FIGS. 1 and 2, a solenoid valve 100 according to one embodiment of the present disclosure includes all or some of an armature 110, a sleeve 120, a pusher 130, a stator 140, a seal 150, a spool 160, a spring 170, a spring support 180, and a plurality of lines 192, 194, and 196.

The armature 110 is coupled to the inside of the sleeve 120. The armature 110 may vertically move inside the sleeve 120. For example, when a current is applied to a coil (not illustrated) mounted inside the sleeve 120, the armature 110 moves in a downward direction in FIG. 1 to press the pusher 130. Meanwhile, when a current is not applied to the coil mounted inside the sleeve 120, the armature 110 moves in an upward direction in FIG. 1 based on a restoring force of the spring 170.

When the armature 110 moves downward, a line between the pusher 130 and the stator 140 is closed. Meanwhile, when the armature 110 moves upward, the line between the pusher 130 and the stator 140 is opened.

One end of the pusher 130 is coupled to the inside of the sleeve 120 to be in contact with the armature 110. Further, a body of the pusher 130 passes through the stator 140 and the other end of the pusher 130 is in contact with the spool 160.

The pusher 130 vertically moves inside the stator 140 based on the vertical movement of the armature 110. For example, when the armature 110 presses the pusher 130 downward, the pusher 130 presses the spring 170 in contact with the spool 160, and the spring 170 is compressed. Meanwhile, when the armature 110 moves upward, the pusher 130 no longer presses the spring 170. Thus, the pusher 130 presses the armature 110 upward based on the restoring force of the spring 170.

The stator 140 includes an upper sealing part 142, stator bodies 144 and 146, and a lower sealing part 148.

The stator bodies 144 and 146 include a first sealing part 144 on which the seal 150 is mounted and a second sealing part 146 that presses the lower sealing part 148.

The first sealing part 144 performs a sealing function so that the brake fluid introduced into the second input line 194 is not discharged to or introduced from the outside of the solenoid valve 100. The seal 150 is mounted on the first sealing part 144. The seal 150 may be, for example, an X seal or the like.

The second sealing part 146 is coupled to the lower sealing part 148. The second sealing part 146 performs a sealing function so that the brake fluid is not discharged to the outside of the solenoid valve 100 by pressing the lower sealing part 148.

The spool 160 is coupled to an end of the pusher 130 to press the spring 170 based on the vertical movement of the pusher 130. For example, when the pusher 130 moves downward to press the spool 160, the spool 160 presses the spring 170 so that the spring 170 is compressed. Meanwhile, when the spring 170 is expanded based on the restoring force, the spool 160 pushes the pusher 130 upward.

The spring 170 has one end in contact with the spool 160 and the other end mounted on and supported by the spring support 180. When the armature 110 moves vertically, the spring 170 is compressed based on a force received from the pusher 130.

The spring support 180 supports the spring 170 so that the spring 170 is compressed.

Hereinafter, a path in which the brake fluid moves in the plurality of lines 192, 194, and 196, which communicate each other, inside the solenoid valve 100 according to the embodiment of the present disclosure based on the vertical movement of the armature 110 will be described in detail.

A wheel brake (not illustrated) receives hydraulic pressure from a hydraulic pressure generation unit, for example, a main master cylinder (not illustrated) or a sub-master cylinder (not illustrated). For example, when a motor that generates the hydraulic pressure in the main master cylinder operates normally, the hydraulic pressure formed in the main master cylinder passes through the solenoid valve 100 and is supplied to the wheel brake.

In the detailed description of the present disclosure, a line through which the brake fluid is supplied from the main master cylinder is referred to as the first input line 192. The brake fluid introduced into the solenoid valve 100 through the first input line 192 is discharged in a direction toward the output line 196.

In order for the brake fluid introduced into the solenoid valve 100 using the first input line 192 to be discharged in the direction toward the output line 196, the pusher 130 should move downward to press the spring 170. Thus, when the solenoid valve 100 receives the hydraulic pressure from the main master cylinder, a controller (not illustrated) applies a current to the solenoid valve 100 so that the armature 110 presses the pusher 130 downward. When the current is applied, the armature 110 moves downward to press the pusher 130. When the pusher 130 moves downward, the brake fluid may pass through the first input line 192 and may be introduced into the solenoid valve 100.

Meanwhile, when the motor that generates the hydraulic pressure in the main master cylinder does not operate normally, for example, in a motor failure situation, the hydraulic pressure formed in the sub-master cylinder passes through the solenoid valve 100 and is supplied to the wheel brake.

In the detailed description of the present disclosure, a line through which the brake fluid is supplied from the sub-master cylinder is referred to as the second input line 194. The brake fluid introduced into the solenoid valve 100 through the second input line 194 is discharged in the direction toward the output line 196.

In order for the brake fluid introduced into the solenoid valve 100 using the second input line 194 to be discharged in the direction toward the output line 196, the pusher 130 should move upward based on the restoring force of the spring 170. Thus, when the solenoid valve 100 receives the hydraulic pressure from the sub-master cylinder, the controller cuts off the current applied to the armature 110 so that the armature 110 no longer presses the pusher 130 downward. When the current is cut off, the spring 170 is expanded based on the restoring force, and the pusher 130 moves upward. When the pusher 130 moves upward, the brake fluid may pass through the second input line 194 and may be introduced into the solenoid valve 100.

The brake fluid discharged from the solenoid valve 100 in a direction toward the output line 196 is supplied to the wheel brake.

The solenoid valve 100 according to the embodiment of the present disclosure includes the two input lines 192 and 194 and the one output line 196.

A solenoid valve according to the related art includes one input line and one output line. Thus, two solenoid valves are required to receive the hydraulic pressure from the main master cylinder and the sub-master cylinder.

However, the solenoid valve 100 according to the embodiment of the present disclosure includes a plurality of input lines 192 and 194, and the plurality of input lines 192 and 194 are opened or closed by the vertical movement of the pusher 130. Thus, even when one solenoid valve is used, there is an effect of the solenoid valve 100 being capable of performing the same function as the two solenoid valves according to the related art.

Thus, the solenoid valve 100 according to one embodiment of the present disclosure has the effect of reducing manufacturing costs by reducing the number of solenoid valves mounted inside an electric hydraulic brake device.

Figure 3:
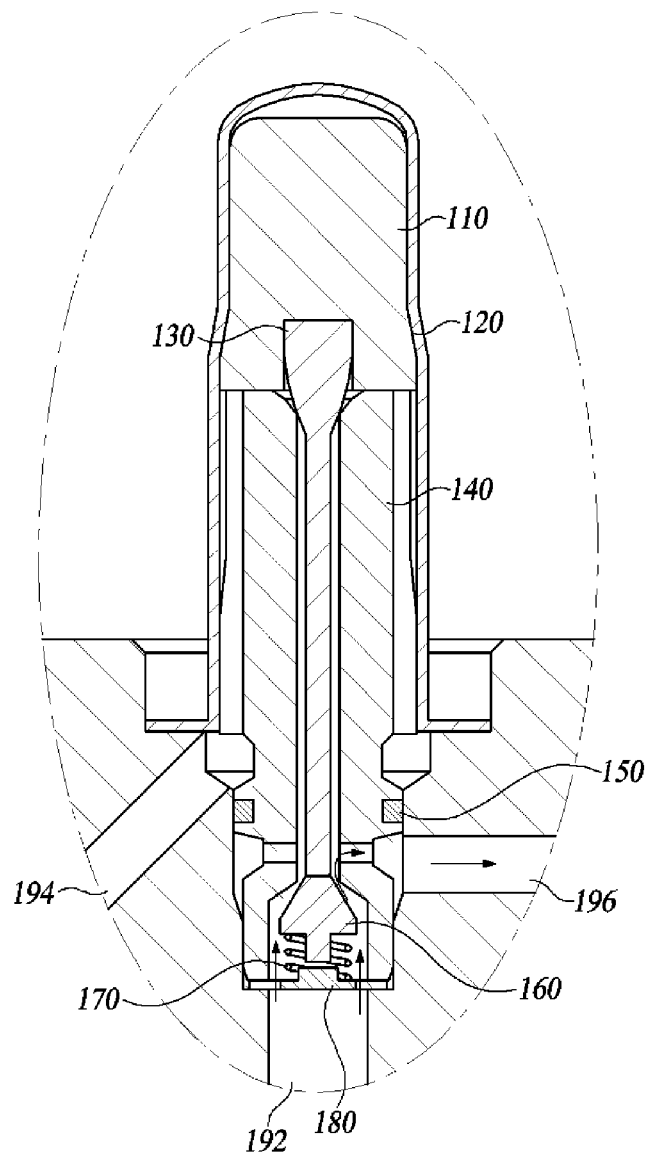
FIG. 3 is a view illustrating inflow and outflow paths of brake fluid flowing inside the solenoid valve being operated when a current is applied to the solenoid valve according to the embodiment of the present disclosure.

FIG. 3 is a view illustrating inflow and outflow paths of brake fluid flowing inside the solenoid valve being operated when a current is applied to the solenoid valve according to the embodiment of the present disclosure.

Referring to FIG. 3, a current is applied to the solenoid valve 100 according to one embodiment of the present disclosure to close an upper line and open a lower line.

In the detailed description of the present disclosure, a line through which the brake fluid introduced using the first input line 192 is discharged in a direction toward the output line 196 is defined as the lower line. Meanwhile, a line through which the brake fluid introduced using the second input line 194 is discharged in the direction toward the output line 196 is defined as the upper line. The brake fluid passing through the upper line will be described in more detail with reference to FIG. 4.

When the brake fluid is supplied from the main master cylinder, the solenoid valve 100 should receive a current from the controller. When the current is applied to the solenoid valve 100, the armature 110 moves downward. When the armature 110 moves downward, a passage between the pusher 130 and the stator 140, that is, the upper line, is closed. Further, the pusher 130 presses the spool 160 to compress the spring 170. Thus, a passage between the stator 140 and the spool 160, that is, the lower line, is opened.

Thus, the brake fluid introduced from the first input line 192 cannot move to the upper line and is discharged from the solenoid valve 100 using the output line 196. The discharged brake fluid is transferred to the wheel brake.

Figure 4:
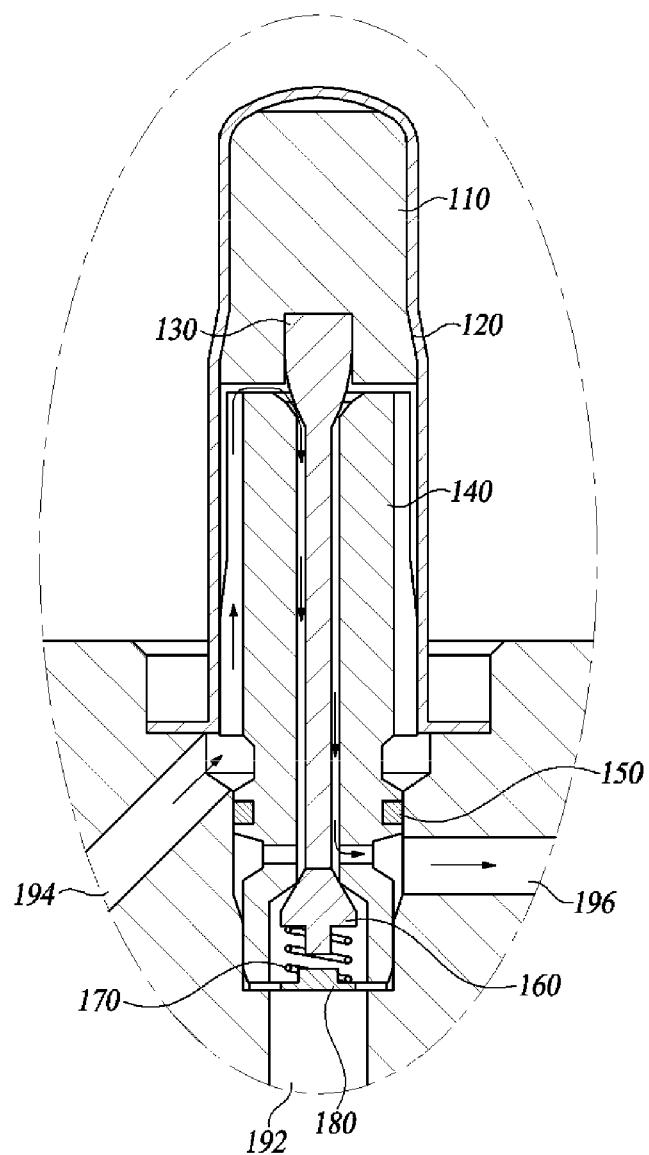
FIG. 4 is a view illustrating inflow and outflow paths of brake fluid flowing inside the solenoid valve not being operated when a current is cut off in the solenoid valve according to the embodiment of the present disclosure.

FIG. 4 is a view illustrating inflow and outflow paths of brake fluid flowing inside the solenoid valve not being operated when a current is cut off in the solenoid valve according to the embodiment of the present disclosure.

When the brake fluid is supplied from the sub-master cylinder, the solenoid valve 100 should cut off a current from the controller. When the current is cut off in the solenoid valve 100, the armature 110 no longer moves downward and moves upward. When the armature 110 moves upward, the passage between the pusher 130 and the stator 140, that is, the upper line, is opened. Further, since the pusher 130 no longer presses the spool 160, the spring 170 is expanded based on the restoring force. Thus, the passage between the stator 140 and the spool 160, that is, the lower line, is closed.

Thus, the brake fluid introduced from the second input line 194 cannot move to the lower line and is discharged from the solenoid valve 100 using the output line 196. The discharged brake fluid is transferred to the wheel brake.

Although exemplary embodiments of the present disclosure have been described for illustrative purposes, those skilled in the art will appreciate that various modifications, additions, and substitutions are possible, without departing from the idea and scope of the present disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the present disclosure is not to be limited by the above explicitly described embodiments but by the claims and equivalents thereof.

What is claimed is:

1. A solenoid valve comprising:
   an armature that is movable upward or downward based on whether a current is supplied;
   a pusher that is in contact with the armature and linearly movable based on a movement of the armature;
   a spring that is compressed or expanded based on a linear movement of the pusher;
   a plurality of input lines that receive brake fluid from a main master cylinder or a sub-master cylinder;
   an output line that supplies the brake fluid in a direction toward a wheel brake; and
   a stator that connects the plurality of input lines and the output line to provide a movement path, through which the brake fluid moves,
   wherein one input line is opened and the other input lines are closed, among the plurality of input lines, based on whether the current is supplied, and
   when the current is cut off in the armature and one of the input lines is connected to the output line, the brake fluid introduced from the one of the input lines flows in both upward and downward directions toward the output line.

2. The solenoid valve of claim 1, wherein the plurality of input lines include:
   a first input line connected to the main master cylinder; and
   a second input line connected to the sub-master cylinder.

3. The solenoid valve of claim 2, wherein the armature moves downward when the current is supplied to press the pusher downward so as to compress the spring, and
   the stator discharges, in a direction toward the output line, the brake fluid introduced using the first input line and closes the second input line.

4. The solenoid valve of claim 2, wherein the armature moves upward when the current is cut off to expand the spring, and
   the stator discharges, in a direction toward the output line, the brake fluid introduced using the second input line and closes the first input line.

5. The solenoid valve of claim 1, wherein the stator includes an upper sealing part, a first sealing part, a second sealing part, and a lower sealing part.

6. The solenoid valve of claim 5, wherein an X seal is mounted on an outer side of the first sealing part so that the first sealing part is sealed and thus the brake fluid is not discharged to an outside.

7. The solenoid valve of claim 5, wherein the lower sealing part is press-fitted so that the second sealing part is sealed, and thus the brake fluid is not discharged to an outside.

8. The solenoid valve of claim 2, wherein the pusher has a first end in contact with the armature, and when the current is supplied to the armature and the first end moves downward, the armature comes into contact with the stator and closes the second input line.

9. The solenoid valve of claim 8, wherein when the current is supplied to the armature and the pusher moves downward, the armature comes into contact with the stator and closes the second input line, and
   when the current is cut off in the armature and the pusher moves upward, the armature is spaced apart from the stator and opens the second input line.

10. The solenoid valve of claim 2, wherein the pusher has a first end in contact with the armature and a second end in contact with a spool that is in contact with the spring, and
    the spool opens or closes the first input line based on the linear movement of the pusher.

11. The solenoid valve of claim 10, wherein when the current is supplied to the armature, the spool moves downward to open the first input line, and when the current is cut off in the armature, the spool moves upward to close the first input line.

12. The solenoid valve of claim 1, wherein when the current is cut off in the armature and the pusher moves upward, the brake fluid flows in both upward and downward directions along a radially outer space and a radially inner space of the stator, respectively.

13. A solenoid valve comprising:
  an armature that is movable upward or downward based on whether a current is supplied;
  a pusher that is in contact with the armature and linearly movable based on a movement of the armature;
  a spring that is compressed or expanded based on a linear movement of the pusher;
  a plurality of input lines that receive brake fluid from a main master cylinder or a sub-master cylinder;
  an output line that supplies the brake fluid in a direction toward a wheel brake; and
  a stator that connects the plurality of input lines and the output line to provide a movement path, through which the brake fluid moves,
  wherein one input line is opened and the other input lines are closed, among the plurality of input lines, based on whether the current is supplied,
  when the current is cut off in the armature so that the armature moves upward, the brake fluid passes through an upper line disposed above the output line, and
  when the current is supplied to the armature that the armature moves downward, the brake fluid passes through a lower line disposed below the output line.

\* \* \* \* \*